United States Patent [19]

Dagdeviren

[11] Patent Number: 5,724,393
[45] Date of Patent: Mar. 3, 1998

[54] METHOD AND APPARATUS COMPENSATING FOR EFFECTS OF DIGITAL LOSS INSERTION IN SIGNAL TRANSMISSIONS BETWEEN MODEMS

[75] Inventor: Nuri Ruhi Dagdeviren, Red Bank, N.J.

[73] Assignee: Lucent Technologies Inc., Murray Hill, N.J.

[21] Appl. No.: 390,185

[22] Filed: Feb. 17, 1995

[51] Int. Cl.$^6$ ....................................... H04K 1/02
[52] U.S. Cl. ........................ 375/296; 375/222; 379/94
[58] Field of Search .................... 375/211, 214, 375/216, 222, 220, 242, 243, 245, 296; 341/143, 144, 155; 370/469; 379/414, 94, 97, 98

[56] References Cited

U.S. PATENT DOCUMENTS

| | | | |
|---|---|---|---|
| 5,008,672 | 4/1991 | Leedy | 341/138 |
| 5,394,437 | 2/1995 | Ayonoglo | 375/222 |
| 5,406,583 | 4/1995 | Dagdeviren | 375/216 |

Primary Examiner—Tesfaldet Bocure
Assistant Examiner—Bryan Webster
Attorney, Agent, or Firm—Nicholas J. Skarlatos

[57] ABSTRACT

The present invention provides a method and apparatus for minimizing quantization noise in signal transmissions between modems coupled together via a digital network resulting from the performance of digital loss insertion in μ-law encoded signal transmissions when the receiving modem is coupled to the digital network via an analog subscriber loop. In a preferred embodiment, the minimization of quantization noise is effected by providing in a digital modem means for μ-law encoding and decoding of signal transmissions, means for scaling the amplitude levels of signals generated by the first modem down by a predetermined reduction factor to obtain factored signals in addition to means for performing an inversion mapping comprising a scaling of the amplitude level of the factored, μ-law encoded signals up by a predetermined inversion factor to obtain a gain in the amplitude level of the factored signals corresponding to the predetermined loss inserted in the amplitude levels of the transmitted μ-law encoded signals. In accordance with an alternate embodiment, the minimization of quantization noise is effected independently of the transmitting modem through an inversion mapping of μ-law encoded signals forming μ-law code words when transmitted through an interexchange (IEC) digital network. The inversion mapping is performed by scaling the amplitude levels of μ-law code words up by a predetermined inversion factor to obtain a gain corresponding to the predetermined loss subsequently inserted in the amplitude levels of the μ-law code words. This is accomplished by providing within a digital switch of the IEC network means for detecting one of the existence of a terminating analog subscriber loop and the occurrence of loss insertion over the digital network, means for determining the amount of loss inserted in the signal transmissions, means for performing a μ-law code word-to-code word inversion mapping.

11 Claims, 5 Drawing Sheets

| n | mu(n) | n | mu(n) | n | mu(n) | n | mu(n) |
|---|---|---|---|---|---|---|---|
| 0 | 0 | 36 | 65.5 | 72 | 375.5 | 108 | 1807.5 |
| 1 | 1 | 37 | 69.5 | 73 | 391.5 | 109 | 1871.5 |
| 2 | 2 | 38 | 73.5 | 74 | 407.5 | 110 | 1935.5 |
| 3 | 3 | 39 | 77.5 | 75 | 423.5 | 111 | 1999.5 |
| 4 | 4 | 40 | 81.5 | 76 | 439.5 | 112 | 2095.5 |
| 5 | 5 | 41 | 85.5 | 77 | 455.5 | 113 | 2223.5 |
| 6 | 6 | 42 | 89.5 | 78 | 471.5 | 114 | 2351.5 |
| 7 | 7 | 43 | 93.5 | 79 | 487.5 | 115 | 2479.5 |
| 8 | 8 | 44 | 97.5 | 80 | 511.5 | 116 | 2607.5 |
| 9 | 9 | 45 | 101.5 | 81 | 543.5 | 117 | 2735.5 |
| 10 | 10 | 46 | 105.5 | 82 | 575.5 | 118 | 2863.5 |
| 11 | 11 | 47 | 109.5 | 83 | 607.5 | 119 | 2991.5 |
| 12 | 12 | 48 | 115.5 | 84 | 639.5 | 120 | 3119.5 |
| 13 | 13 | 49 | 123.5 | 85 | 671.5 | 121 | 3247.5 |
| 14 | 14 | 50 | 131.5 | 86 | 703.5 | 122 | 3375.5 |
| 15 | 15 | 51 | 139.5 | 87 | 735.5 | 123 | 3503.5 |
| 16 | 16.5 | 52 | 147.5 | 88 | 767.5 | 124 | 3631.5 |
| 17 | 18.5 | 53 | 155.5 | 89 | 799.5 | 125 | 3759.5 |
| 18 | 20.5 | 54 | 163.5 | 90 | 831.5 | 126 | 3887.5 |
| 19 | 22.5 | 55 | 171.5 | 91 | 863.5 | 127 | 4015.5 |
| 20 | 24.5 | 56 | 179.5 | 92 | 895.5 | | |
| 21 | 26.5 | 57 | 187.5 | 93 | 927.5 | | |
| 22 | 28.5 | 58 | 195.5 | 94 | 959.5 | | |
| 23 | 30.5 | 59 | 203.5 | 95 | 991.5 | | |
| 24 | 32.5 | 60 | 211.5 | 96 | 1039.5 | | |
| 25 | 34.5 | 61 | 219.5 | 97 | 1103.5 | | |
| 26 | 36.5 | 62 | 227.5 | 98 | 1167.5 | | |
| 27 | 38.5 | 63 | 235.5 | 99 | 1231.5 | | |
| 28 | 40.5 | 64 | 247.5 | 100 | 1295.5 | | |
| 29 | 42.5 | 65 | 263.5 | 101 | 1359.5 | | |
| 30 | 44.5 | 66 | 279.5 | 102 | 1423.5 | | |
| 31 | 46.5 | 67 | 295.5 | 103 | 1487.5 | | |
| 32 | 49.5 | 68 | 311.5 | 104 | 1551.5 | | |
| 33 | 53.5 | 69 | 327.5 | 105 | 1615.5 | | |
| 34 | 57.5 | 70 | 343.5 | 106 | 1679.5 | | |
| 35 | 61.5 | 71 | 359.5 | 107 | 1743.5 | | |

FIG. 4B

| n | (⌊n/2⌋) | n | (⌊n/2⌋) | n | (⌊n/2⌋) | n | (⌊n/2⌋) |
|---|---|---|---|---|---|---|---|
| 0 | 0 | 36 | 24 | 72 | 57 | 108 | 92 |
| 1 | 1 | 37 | 25 | 73 | 58 | 109 | 93 |
| 2 | 1 | 38 | 26 | 74 | 59 | 110 | 94 |
| 3 | 2 | 39 | 27 | 75 | 60 | 111 | 95 |
| 4 | 2 | 40 | 28 | 76 | 61 | 112 | 96 |
| 5 | 3 | 41 | 29 | 77 | 62 | 113 | 97 |
| 6 | 3 | 42 | 30 | 78 | 63 | 114 | 98 |
| 7 | 4 | 43 | 31 | 79 | 64 | 115 | 99 |
| 8 | 4 | 44 | 32 | 80 | 65 | 116 | 100 |
| 9 | 5 | 45 | 32 | 81 | 66 | 117 | 101 |
| 10 | 5 | 46 | 33 | 82 | 67 | 118 | 102 |
| 11 | 6 | 47 | 33 | 83 | 68 | 119 | 103 |
| 12 | 6 | 48 | 34 | 84 | 69 | 120 | 104 |
| 13 | 7 | 49 | 35 | 85 | 70 | 121 | 105 |
| 14 | 7 | 50 | 36 | 86 | 71 | 122 | 106 |
| 15 | 8 | 51 | 37 | 87 | 72 | 123 | 107 |
| 16 | 8 | 52 | 38 | 88 | 73 | 124 | 108 |
| 17 | 9 | 53 | 39 | 89 | 74 | 125 | 109 |
| 18 | 10 | 54 | 40 | 90 | 75 | 126 | 110 |
| 19 | 11 | 55 | 41 | 91 | 76 | 127 | 111 |
| 20 | 12 | 56 | 42 | 92 | 77 | | |
| 21 | 13 | 57 | 43 | 93 | 78 | | |
| 22 | 14 | 58 | 44 | 94 | 79 | | |
| 23 | 15 | 59 | 45 | 95 | 79 | | |
| 24 | 16 | 60 | 46 | 96 | 80 | | |
| 25 | 16 | 61 | 47 | 97 | 81 | | |
| 26 | 17 | 62 | 48 | 98 | 82 | | |
| 27 | 17 | 63 | 48 | 99 | 83 | | |
| 28 | 18 | 64 | 49 | 100 | 84 | | |
| 29 | 18 | 65 | 50 | 101 | 85 | | |
| 30 | 19 | 66 | 51 | 102 | 86 | | |
| 31 | 19 | 67 | 52 | 103 | 87 | | |
| 32 | 20 | 68 | 53 | 104 | 88 | | |
| 33 | 21 | 69 | 54 | 105 | 89 | | |
| 34 | 22 | 70 | 55 | 106 | 90 | | |
| 35 | 23 | 71 | 56 | 107 | 91 | | |

FIG. 4C

| n | (n/√2) | n | (n/√2) | n | (n/√2) | n | (n/√2) |
|---|---|---|---|---|---|---|---|
| 0 | 0 | 36 | 31 | 72 | 65 | 108 | 100 |
| 1 | 1 | 37 | 32 | 73 | 66 | 109 | 100 |
| 2 | 1 | 38 | 33 | 74 | 67 | 110 | 101 |
| 3 | 2 | 39 | 33 | 75 | 67 | 111 | 102 |
| 4 | 3 | 40 | 34 | 76 | 68 | 112 | 103 |
| 5 | 4 | 41 | 35 | 77 | 69 | 113 | 104 |
| 6 | 4 | 42 | 35 | 78 | 69 | 114 | 106 |
| 7 | 5 | 43 | 36 | 79 | 70 | 115 | 107 |
| 8 | 6 | 44 | 37 | 80 | 71 | 116 | 109 |
| 9 | 6 | 45 | 38 | 81 | 73 | 117 | 110 |
| 10 | 7 | 46 | 38 | 82 | 74 | 118 | 111 |
| 11 | 8 | 47 | 39 | 83 | 75 | 119 | 112 |
| 12 | 8 | 48 | 40 | 84 | 77 | 120 | 113 |
| 13 | 9 | 49 | 41 | 85 | 78 | 121 | 114 |
| 14 | 10 | 50 | 43 | 86 | 79 | 122 | 114 |
| 15 | 11 | 51 | 44 | 87 | 80 | 123 | 115 |
| 16 | 12 | 52 | 46 | 88 | 81 | 124 | 116 |
| 17 | 13 | 53 | 47 | 89 | 82 | 125 | 116 |
| 18 | 14 | 54 | 48 | 90 | 82 | 126 | 117 |
| 19 | 16 | 55 | 49 | 91 | 83 | 127 | 118 |
| 20 | 16 | 56 | 49 | 92 | 84 | | |
| 21 | 17 | 57 | 50 | 93 | 85 | | |
| 22 | 18 | 58 | 51 | 94 | 85 | | |
| 23 | 19 | 59 | 52 | 95 | 86 | | |
| 24 | 19 | 60 | 52 | 96 | 87 | | |
| 25 | 20 | 61 | 53 | 97 | 88 | | |
| 26 | 21 | 62 | 54 | 98 | 90 | | |
| 27 | 21 | 63 | 54 | 99 | 91 | | |
| 28 | 22 | 64 | 55 | 100 | 93 | | |
| 29 | 23 | 65 | 57 | 101 | 94 | | |
| 30 | 23 | 66 | 58 | 102 | 95 | | |
| 31 | 24 | 67 | 60 | 103 | 96 | | |
| 32 | 25 | 68 | 61 | 104 | 97 | | |
| 33 | 27 | 69 | 63 | 105 | 98 | | |
| 34 | 28 | 70 | 64 | 106 | 98 | | |
| 35 | 23 | 71 | 64 | 107 | 99 | | | ns between modems is achieved by an inversion mapping of
METHOD AND APPARATUS COMPENSATING FOR EFFECTS OF DIGITAL LOSS INSERTION IN SIGNAL TRANSMISSIONS BETWEEN MODEMS

BACKGROUND OF THE INVENTION

This invention relates to the resolution of errors caused by digital loss insertion in transmissions between high speed modems over a digital network.

In a co-pending application entitled "A High Speed Modem Synchronized To Remote Codec" Ser. No. 07/963,539 U.S. Pat. No. 5,394,437, filed Oct. 20, 1992 and assigned to the assignee hereof, an invention was disclosed for employing modems that are synchronized to the A/D and D/A converter clocks of the digital network over which signals are communicated. Specifically, a "μ-law modem" was described, which is a modem synchronized both in time and in quantization levels to the A/D converters in the network, and which further takes into account the compressions introduced in the telephone network. The synchronizing of such modems to the telephone network permits one to greatly reduce the noise that is introduced into the signals and also allows user modems to operate at the network's clock rate.

One characteristic of the improved modem disclosed in the above-referenced patent application is that the signals generated by the modem take into account the/μ-law compressions and expansions in the telephone network that must be performed to achieve a constant signal/distortion performance over the wide dynamic range required for the transmission of voice signals. These μ-law compression and expansion operations are accomplished through the use of PCM μ-law encoders and decoders implemented on the digital side of the telephone network as shown in FIGS. 1 & 2.

Figure 1:
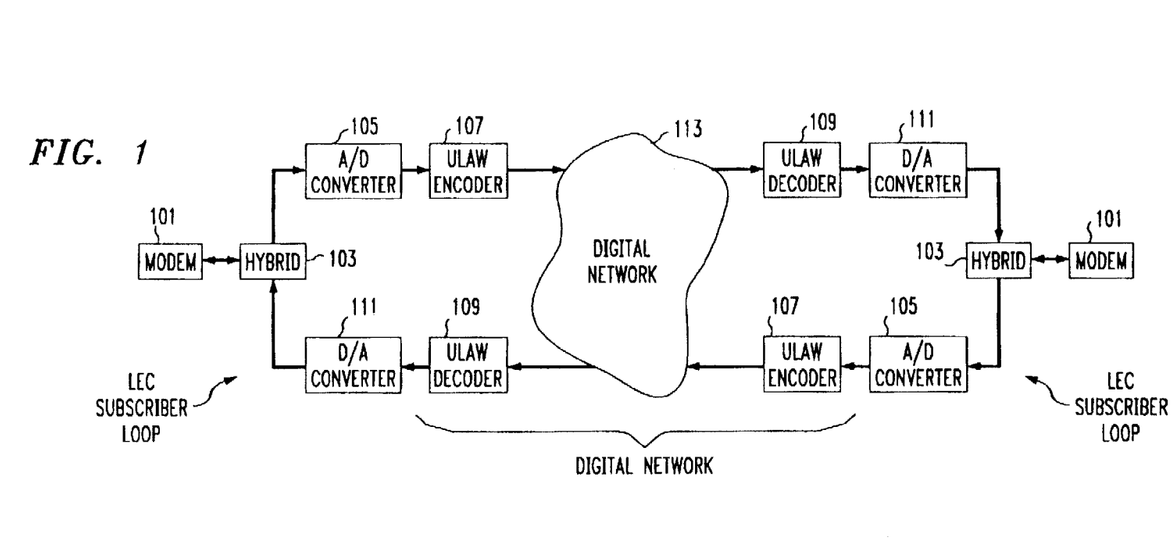
FIG. 1 is a block diagram of two modems coupled together via a communications network comprising a digital network disposed between two analog subscriber loops, the diagram depicting the A/D and D/A converters as well as the μ-law encoders and decoders preferably disposed within the central offices of the respective originating and terminating central offices.
Figure 2:
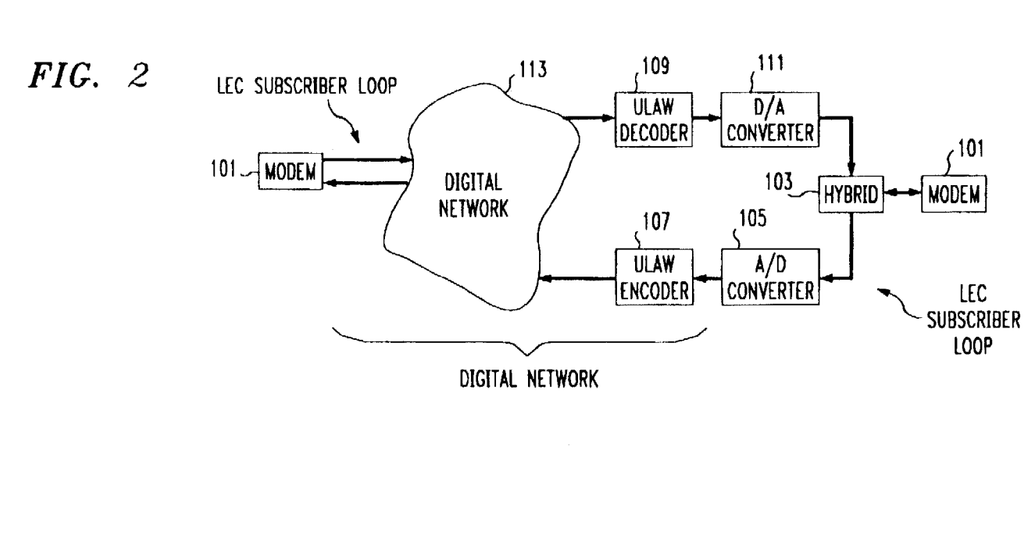
FIG. 2 is a block diagram of two modems coupled together via a communications network comprising at least a digital network and a terminating analog subscriber loop, the diagram depicting the A/D and D/A converters as well as the μ-law encoders and decoders disposed within the central office of the terminating central office.

With reference to FIG. 1, two modems are shown coupled together via a digital network. Between each modem and the network is a Local-Exchange Carrier (LEC) subscriber loop coupled to a LEC Central Office or another equivalent A/D conversion element. Referring hereinafter to an analog type subscriber loop, a hybrid is provided within the Central Office for separating the bi-directional analog signals received from a transmitting modem into unidirectional signals sent to and received from the digital network via the μ-law encoders and decoders in addition to respective A/D and D/A converters. On the transmitting side, an original, analog signal $A_n$ input to the network is converted by the A/D converter into a digital signal $B_n$ typically consisting of 14 bits, which signal is then μ-law encoded into a digital μ-law code word N typically consisting of 8 bits. To arrive at the code word N, the 14 bit digital signal $B_n$ undergoes a quantization since it must be matched to the nearest 8 bit μ-law signal level corresponding to the resultant code word N. Hence, the signal $B_n$ is converted into a quantized signal $C_n$ which is subsequently mapped to its corresponding μ-law code word N. After transmission over the digital network, the digital code word N is decoded by a μ-law decoder back into the quantized signal $C_n$ on the receiving side and subsequently converted to a corresponding analog signal level $A_n'$ for transmission through the analog LEC portion of the network.

One drawback with the performance of μ-law encoding and decoding is that the quantizing of the digital signal $B_n$ to a predetermined μ-law signal level $C_n$ for mapping into a digital code word N produces an inherent quantization error. This error arises from the fact that the amplitude of the analog signal $A_n'$ regenerated from the quantized signal $C_n$ (during decoding on the receiving side) does not exactly match the analog signal level of the original signal $A_n$. More importantly, however, this mismatch between the transmitted and received analog signal levels becomes significantly worse when the common technique of loss insertion is used to mitigate the adverse effects of echo produced at the hybrids.

Loss insertion is used in the Public Switched Telephone Network to control echo impairment during speech calls through a reduction in the signal amplitude of the transmitted analog signals, and hence, a corresponding reduction in the distortion amplitude. When a signal is to be transmitted over the network, a standardized transmission loss (typically 6 dB for most networks, and 3 dB for the rest) is inserted into the signal path generally before transmission over the analog LEC subscriber loop. The signal amplitude of the received signal is then recovered in the called party's modem through a well-known equalization process which scales the signal amplitude back up to its expected level.

When performed in a digital network, loss insertion can be accomplished by either analog or digital means. Referring first to analog loss insertion, the μ-law code word N transmitted across the digital network is decoded and converted into its corresponding analog signal level $A_n'$ and then scaled down by a factor of 2 (for a 6 dB loss) before it is transmitted to the receiving analog subscriber loop. Digital loss insertion, on the other hand, is accomplished by means of mapping the first μ-law code word N into a second μ-law code word M representing a digital signal having approximately one half the amplitude of the digital signal represented by the first code word N. However, this itself gives rise to a secondary quantization error since, in effect, the mapping from code word N to code word M requires that the quantized signal $C_n$ be divided by a factor of 2 (for a 6 dB loss), which loss inserted signal level is then again quantized to another μ-law level $C_m$ for mapping to the corresponding (second) code word M. The total quantization error then incurred by the two mappings cumulatively yields an error that is on the average twice as large as the first quantization error when considering that the modem's equalization process will bring the two errors to comparative levels.

Although digital loss insertion as compared to analog loss insertion over a digital network obviously introduces a significantly larger quantization error, the digital method is preferred because of the simplicity of its implementation, and hence, its lower cost. Implementation of an analog loss insertion means would require the adaptation of a significant number of potentiometers to the switches of each LEC Central Office, whereas digital loss insertion can be achieved through the use of a code word N to code word M mapping table implemented within either the IEC digital network or the μ-law decoder on the receiving side of the network.

Hence, it would be desirable to provide a means for reducing the over-all quantization error made worse by use of the digital loss insertion technique in modem transmissions over a digital network.

SUMMARY OF THE INVENTION

A reduction in the total quantization error resulting from the performance of digital loss insertion in transmissions between modems is achieved by an inversion mapping of μ-law code words prior to the digital loss insertion mapping performed at the μ-law decoder. The inversion mapping, performed in one embodiment through a direct code word-to-code word table mapping implemented within the digital portion of the network, scales the amplitude of the already quantized and μ-law encoded signal up by the predetermined loss insertion factor such that when the loss is later digitally inserted at the terminating central office, the secondary quantization error normally introduced by the loss insertion mapping is canceled by the effect of the preceding inversion mapping. That is, if the quantization error produced by μ-law mapping the digital signal $B_n$ into a μ-law code word N is represented by Q1, the quantization error introduced by the loss insertion mapping is represented by Q2, and the quantization error introduced by the inversion mapping is represented by Q3=−Q2, then the total quantization error turns out to be Qt=Q1+Q2+Q3=Q1+Q2−Q2=Q1.

In an alternate embodiment, the method and apparatus of the invention is preferably implemented within a transmitting digital modem having digital access to the digital network. The modem's digital signal to be transmitted is preferably first scaled down by a predetermined constant, μ-law encoded and then scaled up by an inversion mapping before being transmitted over the network. The scaling down of the modem's digital signal ensures that the modification of the average signal amplitude due to the inversion mapping is minimized so as to maintain the amplitude of the received signals within the standard range for the receiving modem.

In either case, the inversion mapping apparatus performs the mapping within one of the digital network and the transmitting modem in accordance with the loss characteristics of the particular terminating analog subscriber loop. The inversion mapping apparatus comprises means for identifying either the existence of a terminating analog subscriber loop or the occurrence of loss insertion over the network, means for selecting one of two inversion mapping tables respectively having values based upon the standardized 3 dB and 6 dB transmission loss characteristics of the particular terminating subscriber loop, in addition to means for performing the mapping. For the first embodiment, the elements of the inversion mapping means are preferably implemented within the IEC network, whereas for the second embodiment, these elements are preferably implemented within the transmitting, digital modem itself.

DETAILED DESCRIPTION

As generally shown in FIGS. 1 & 2, a telephone network contains at least two interfaces in an established long-haul interconnection: a first interface between a first Local Exchange Carrier (LEC) subscriber loop and the Inter-Exchange Carrier (IEC) digital network and a second interface between the IEC digital network and a second LEC subscriber loop. Each interface physically comprises A/D and D/A conversion elements, analog or digital switching and transmission means within the central office of the LEC's central office.

Each conversion means further includes at least a hybrid 103 for separating the bi-directional analog signals received from a transmitting modem 101 into unidirectional transmit and receive signals sent to and received from the digital network 113, respectively. An A/D converter 105 is provided on the transmit side of the hybrid 103 between the hybrid 103 and the digital network 113 for converting the analog signals carried on the LEC subscriber loop into digital form for subsequent transmission on the digital network 113. Similarly, a D/A converter 111 is provided on the receive side of the hybrid 103 between the hybrid 103 and the digital network 113 for converting the digital signals carried on the digital network 113 into analog form for subsequent transmission to a receiving modem 101 via a connecting LEC subscriber loop.

The digital network 113 may comprise among other things a T1 carrier system, an Integrated Services Digital Network (ISDN), a fiber optic cable network, a coaxial cable network, a satellite network, or even a wireless digital communications network. Furthermore, the LEC subscriber loop may comprise either an analog or a digital communications path. With respect to the present invention, it is noted that the format of the subscriber loop may be either analog or digital for operation of the first embodiment, whereas for the second embodiment, the transmitting subscriber loop comprises a digital format to provide digital access directly to the transmitting modem 101.

Figure 4A:
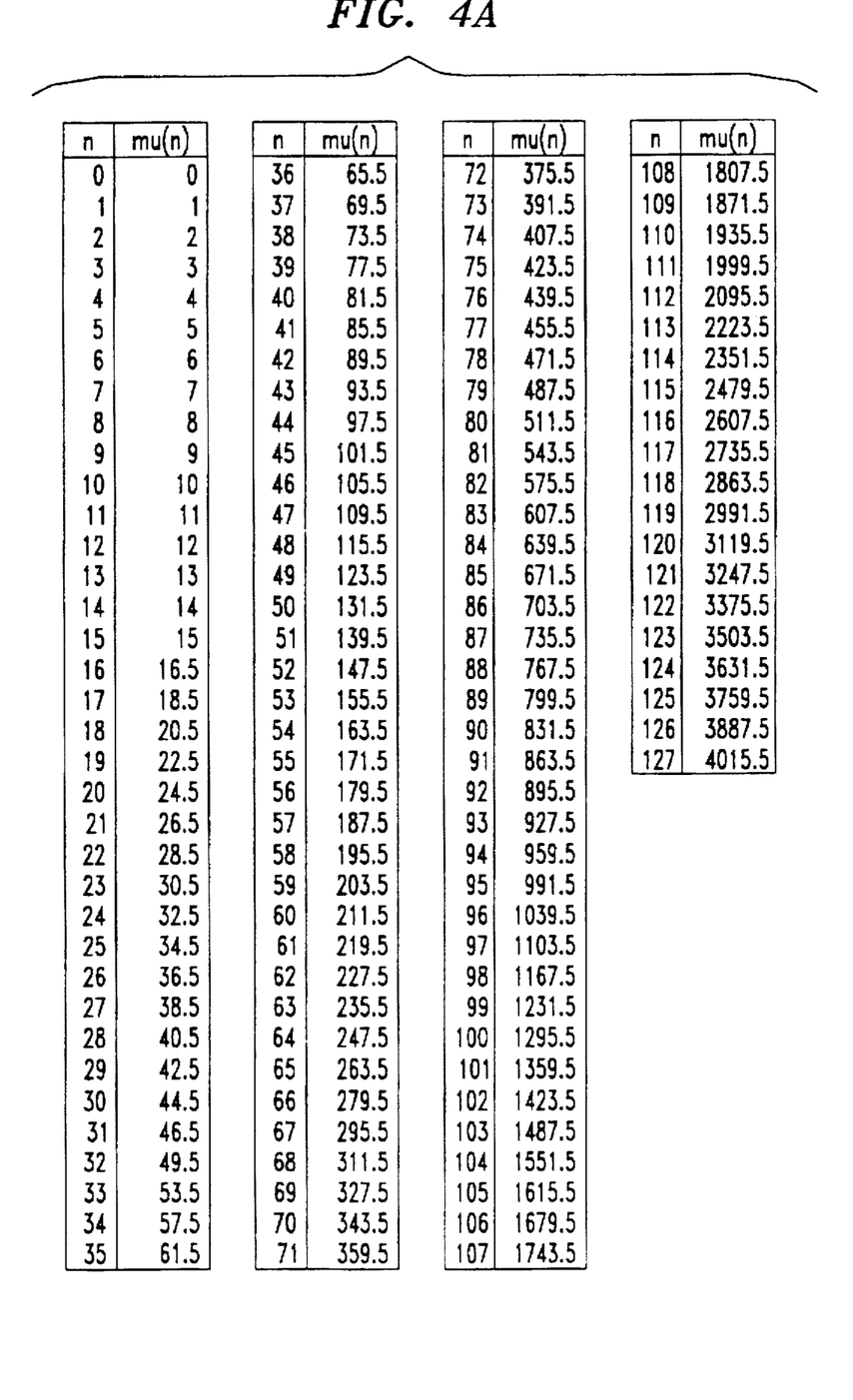
FIG. 4(A) presents a table of μ-Law levels in accordance with the standard μ-255 coding law used for μ-Law encoding and decoding over the digital network.

As previously mentioned, communications over the digital network 113 are conducted in accordance with PCM μ-law encoding and decoding techniques in order that a constant signal/distortion performance over a wide dynamic range be provided for the optimal transmission of voice signals. With reference to FIG. 4(A), a table is shown depicting preselected μ-law analog levels corresponding to the digital μ-law code words in accordance with the standard μ-255 coding law of the ITU standard G.711. Normalization has been chosen such that the digital level (n) 1 corresponds to an analog level $A_n$ of 1 unit.

When μ-law encoding is performed, it is the mismatch in the mapping between the amplitude level of the digital signal $B_n$ and that of the nearest (quantized) μ-law signal $C_n$ which gives rise to the first quantization error. The second quantization error arises from the performance of digital loss insertion in the prior art, which is accomplished by a subsequent μ-law code word-to-code word table mapping. This "loss insertion mapping" essentially transforms the μ-law code word N produced from the first encoding into a μ-law code word M representing a predetermined reduction in the amplitude of the quantized signal $B_n$ (i.e., a $1/\sqrt{2}$ or ½ reduction for a 3 dB or a 6 dB attenuation, respectively, as required by the loss characteristics of the network). Again, the error arises by virtue of the fact that when the loss is inserted through generation of the second μ-law code word M (subsequent to transmission of the signal over the digital network 113), a second mismatch occurs between the attenuated amplitude level of the first μ-law code word N and the amplitude level of the resulting μ-law code word M.

Accordingly, the key to reducing the quantization error in the invention is to prevent the second quantization from occurring. This is accomplished by scaling the amplitude level oft he first code word N up by the inverse of the predetermined loss insertion factor (i.e., by an "inversion factor" of either $\sqrt{2}$ or 2 for a 3 dB or a 6 dB gain, respectively) prior to insertion of the loss at the receiving central office to obtain the μ-law code word P. Hence, upon performance of the μ-law decoding used to insert the loss in the amplitude level of the μ-law code word P, the amplitude level of the resulting μ-law code word N will correspond to the analog amplitude level of the quantized signal $C_n$.

With respect to the first embodiment, shown in FIG. 1, an original analog signal $A_n$ generated by a transmitting modem 101 in response to digital input is transmitted to an originating central office via a LEC subscriber loop. In the central office, the original signal $A_n$ is received by a "near-end" hybrid 103 (i.e. with respect to the transmitting modem 101) which relays the signal $A_n$ to a near-end A/D converter 105 for conversion into the digital signal $B_n$. The digital signal $B_n$ is then sent to a near-end μ-law encoder 107 for mapping into the code word N and subsequent transmission over the digital network 113.

At some point in the digital network 113, the code word N is received by an inversion mapping means (see FIG. 3) which causes the amplitude level of the code word N to be scaled up by the inversion factor (i.e., the inverse of the predetermined loss insertion factor for the receiving analog subscriber loop) so as to produce the code word P. This is preferably accomplished through a direct code word-to-code word mapping using a μ-law mapping table having predetermined values. The resulting code word P actually comprises an amplitude level corresponding to the analog amplitude level of the quantized signal $C_n$ scaled up by the inversion factor comprising a factor of either $\sqrt{2}$ or 2 depending upon the characteristic loss of the particular terminating analog subscriber loop.

Figure 3:
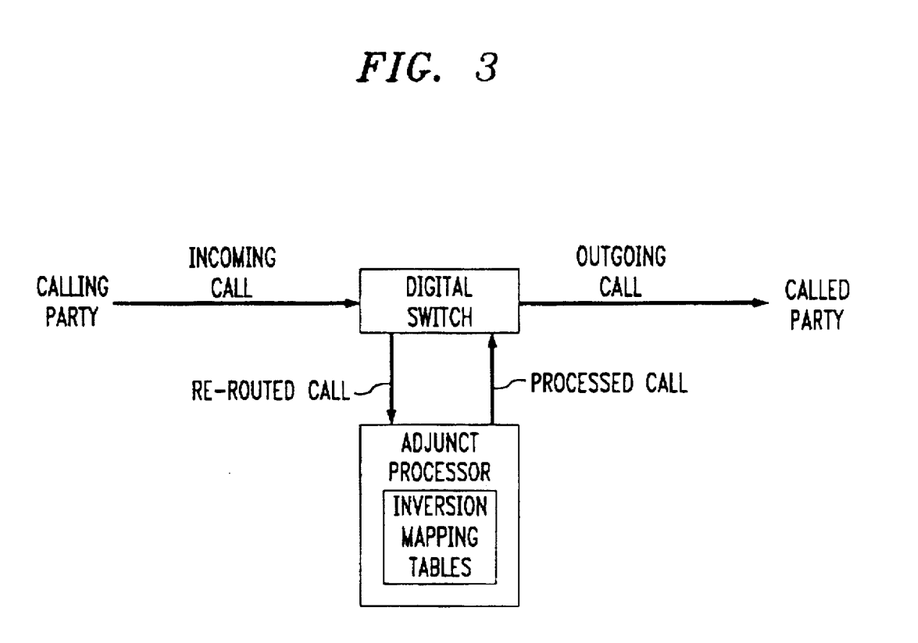
FIG. 3 is a block diagram of one implementation of the inversion mapping means within the digital network, wherein a digital switch and an adjunct processor comprise the elements which form the inversion mapping means.

The code word P is subsequently transmitted through the rest of the digital network 113 to the central office of the terminating central office. Traditional digital loss insertion is then performed at the terminating central office by means of mapping the received code word P into the code word N. This mapping is performed using a μ-law mapping table having predetermined values which conceptually scale the analog amplitude signal level corresponding to the code word P down by the loss insertion factor of the particular terminating subscriber loop to obtain the loss-inserted amplitude level corresponding to the code word N.

Once the loss has been inserted, the code word is input to a far-end μ-law decoder 109 which decodes the code word N into the quantized digital signal $C_n$. The quantized signal $C_n$ is then input to a far-end D/A converter 111 to convert the quantized signal $C_n$ into a corresponding analog signal $A_n"$. The signal $A_n"$ is subsequently sent to a far-end hybrid 103 where it is inserted into the bi-directional analog path for transmission to the receiving modem 101. Upon reception by the receiving modem 101, the modem 101 equalizes the received analog signal $A_n"$ via conventional equalization techniques well-known in the art.

As noted above, the inversion mapping means of the first embodiment scales the amplitude of the quantized analog signal $C_n$ to a higher amplitude preferably through a single direct mapping in the digital network. To enable such a mapping, the standard μ-law table shown in FIG. 4(A) has been adapted so that each quantized μ-law analog signal level $C_n$ listed now corresponds to a μ-law code word P representing a scaled version of the μ-law analog signal level $C_n$. Such a direct μ-law mapping table is shown in each of FIGS. 4(B) & 4(C). As shown, the table of FIG. 4(B) comprises code words precalculated for a 6 dB gain, whereas the table of FIG. 4(C) comprises code words precalculated for a 3 dB gain.

With reference to the direct mapping table of FIG. 4(B), selected on the basis of a terminating subscriber loop having a predetermined loss insertion of 6 dB, an example of the above embodiment will be described. Upon receipt by the originating central office of an analog output signal $A_n$ having an amplitude of 700 units, the signal $A_n$ is converted by the near-end A/D converter 105 into a 14 bit digital signal $B_n$. The digital signal $B_n$ is then input to the near-end μ-law encoder 107 where its amplitude level is quantized to the nearest μ-law analog amplitude signal level shown in the mapping table of FIG. 4(A) to form a new quantized signal $C_n$ having an amplitude of 703.5 units. The μ-law encoder then maps the quantized signal $C_n$ to the predetermined μ-law code word 86 and outputs a corresponding 8 bit digital signal for transmission over the digital network 113.

Figure 4B:
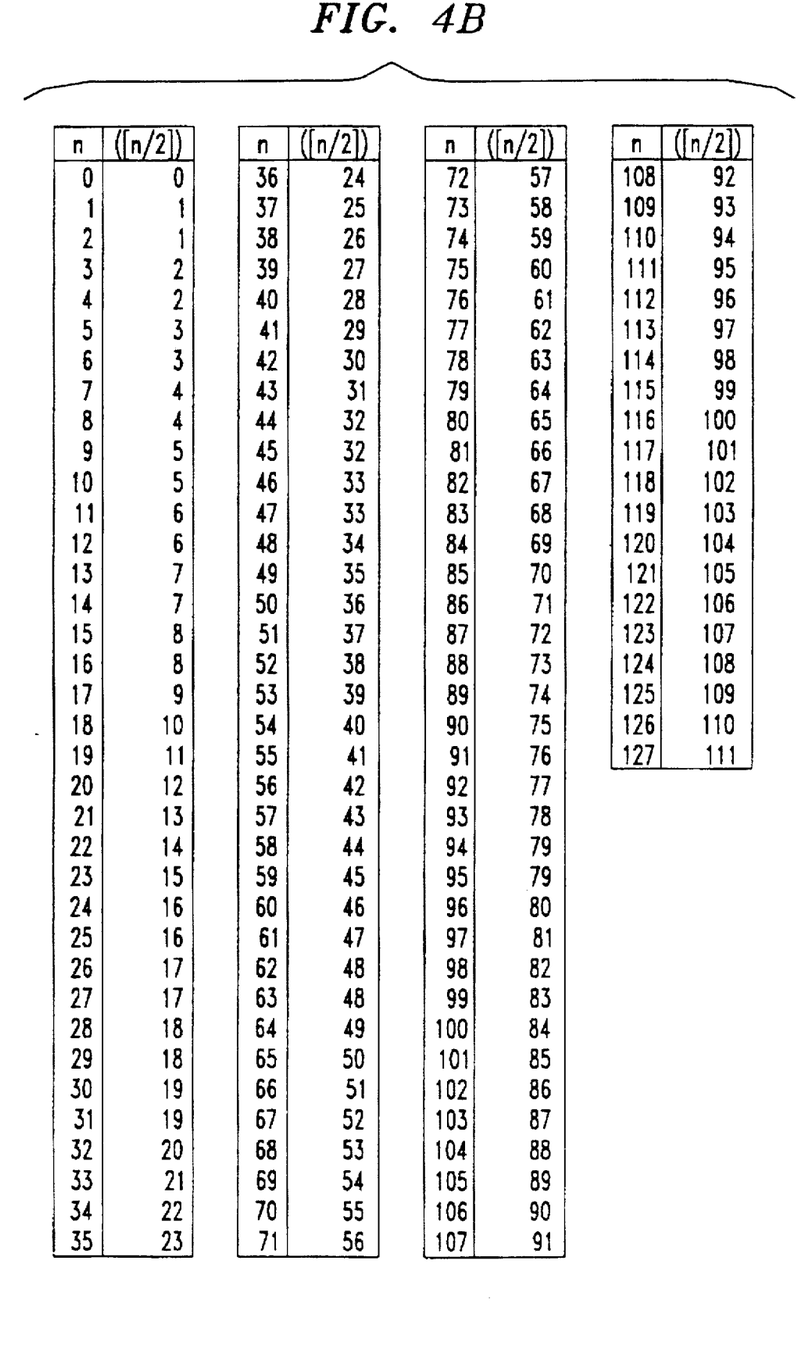
FIG. 4(B) presents a μ-Law inversion mapping table used for direct code word-to-code word mapping between standard μ-Law levels and the μ-Law inversion levels for a terminating analog subscriber loop that inserts a 6 dB loss in the received signals.
Figure 4C:
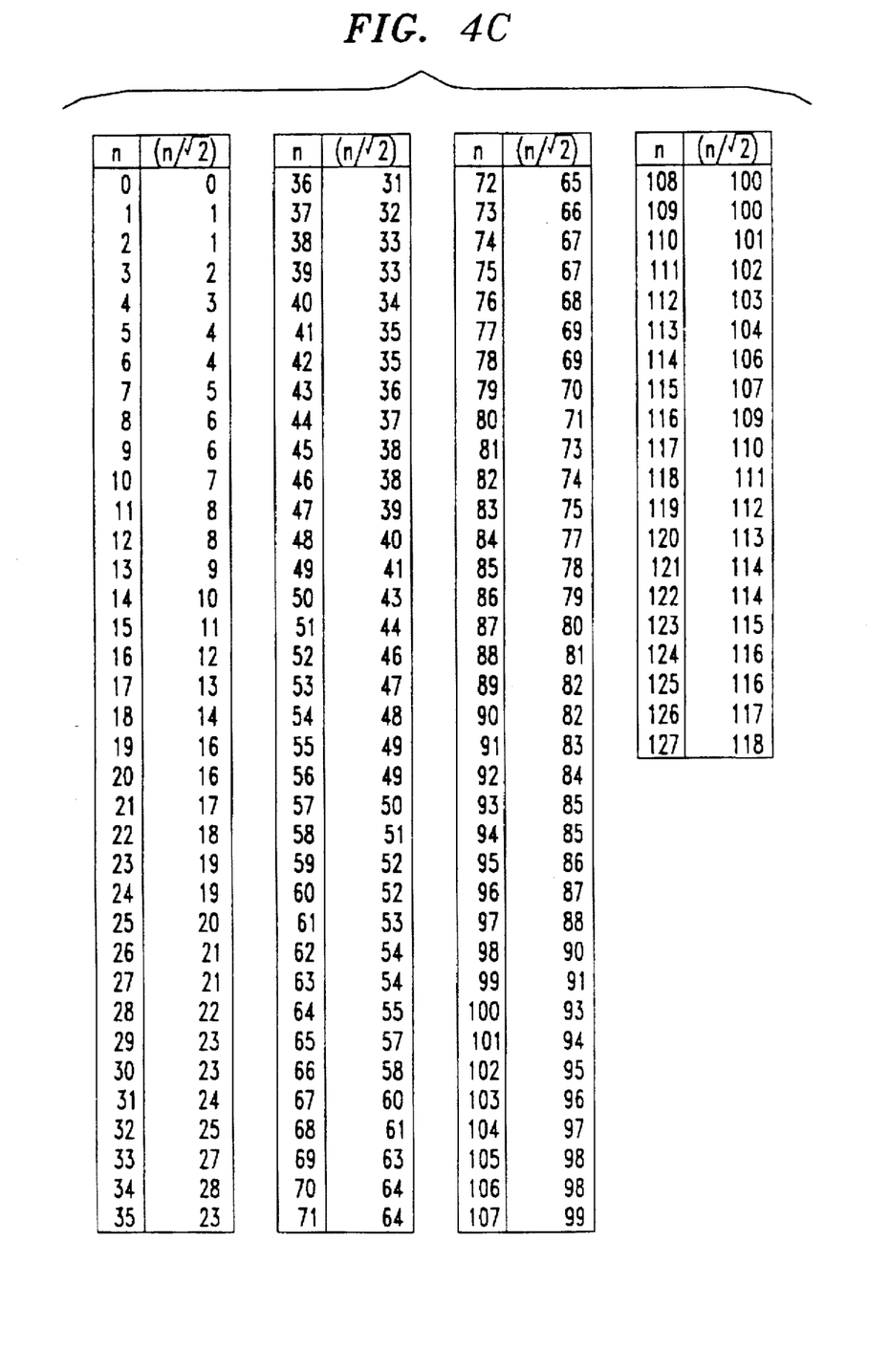
FIG. 4(C) presents a μ-Law inversion mapping table used for direct code word-to-code word mapping between standard μ-Law levels and the μ-Law inversion levels for a terminating analog subscriber loop that inserts a 3 dB loss in the received signals.

When received by the inversion mapping means implemented within the digital network 113, the digital code word 86 is directly mapped to the digital code word 102 using the table of FIG. 4(B), which inversion mapping causes a two-fold increase in the amplitude level of the digital code word 86. At the terminating central office, the digital code word 102 undergoes a loss insertion mapping which transforms the digital code word 102 back into the digital code word 86 corresponding to a one half reduction in the amplitude level of the received code word 102. The digital code word 86 is then input to the far-end μ-law decoder 109 for decoding (in accordance with the standard μ-law mapping table of FIG. 4(A)) into a corresponding 14 bit digital signal, which in this case, comprises the digital signal $C_n$. Upon being converted into an analog signal by means of the far-end D/A converter 111, the resultant output forms the analog signal $A_n"$ having an amplitude of 703.5 units. The terminating central office then outputs the resultant analog signal $A_n"$ to the analog subscriber loop for transmission to the receiving modem 101.

It is noted that although the above embodiment uses a direct inversion mapping for converting the code word N into the code word P, this direct mapping essentially comprises two different mappings, which in a variation on the first embodiment may be performed as separate mapping steps. The first mapping step ("code word mapping") translates the quantized analog signal $C_n$ into a first code word N using the standard μ-law table shown in FIG. 4(A), whereas the second mapping step ("inversion mapping") translates the first code word N into the second code word P by scaling the amplitude level of the quantized signal $C_n$ upward by the inversion factor and quantizing the scaled amplitude level to the nearest μ-law analog level which is then mapped to the second code word P, again using the μ-law table of FIG. 4(A). By separating these two different mappings, it is foreseen that the invention can perform the second inversion mapping step either at the μ-law encoder 107 in the originating central office, at some point in the digital network 113, or even at the μ-law decoder 109 at the terminating central office.

In accordance with a second embodiment of the present invention, shown in FIG. 2, the transmitting modem 101 comprises a digital modem having digital access to the digital network 113 either through a direct connection to the IEC digital network or through a digital LEC subscriber loop. This arrangement is further advantageous since the amplitude level of the original signal generated by the transmitting modem 101 can be attenuated by a predetermined reduction factor before being output to the network in order to place the amplitude level of the resultant analog signal transmitted to the receiving modem 101 within its expected receiving range.

The reduction factor should be selected on the basis of the expected distribution of signal amplitudes for the signals to be transmitted so that the majority of signal amplitudes encountered can be reduced to within the discrete μ-law analog levels corresponding to the optimal receiving range of the receiving modem 101. The lower μ-law analog levels (i.e., 5 units and below) are avoided due to the fact that the signal to distortion ratio is much worse at the lower end of the spectrum, whereas the higher μ-law analog levels (i.e., 3500 units and above) are also avoided because they create saturation effects when converted to analog. Through simulations, however, it has been determined that for a gaussian distribution of signal levels, the best results (i.e., producing the least quantization error) can be obtained by selecting a reduction factor that yields the highest signal power level permitted by regulation, which is typically set by the FCC to be an average power of −9 dBm.

Accordingly, for a system in which signals are transmitted at an average power of −9 dBm, the reduction factor for systems having either a 6 dB loss or a 3 dB loss can be determined from equations (1) and (2) shown below:

$$\sqrt{\frac{\Sigma X_i^2/N}{125970.675}} \text{ for a 6 dB loss} \quad (1)$$

$$\sqrt{\frac{\Sigma X_i^2/N}{2519411.2539}} \text{ for a 3 dB loss} \quad (2)$$

where f is the reduction factor $X_i$ is the average signal amplitude of the $i^{th}$ signal and N is the total number of distinct signals transmitted. These equations are derived by utilizing the equation $$\frac{\Sigma X^2}{N} = \frac{(4015.5)^2}{2} = +3 \text{ dBm} \quad (3)$$

as a reference point for determining the average squared signal amplitude as a function of power based on the ITU μ-law standard G.711. This is done by dividing each side of equation (3) by a factor of 16 (to obtain a power level of −9 dBm) which then yields $\Sigma X^2/N=125970.675$ for a 6 dB loss system and $\Sigma X^2/N=251941.2539$ for a 3 dB loss system. This value for the average squared signal amplitude is then inserted into the equation $$\text{Power} = \frac{\Sigma (X_i/f)^2}{N},$$

which when solved for f results in equation 1. Nonetheless, the reduction factor selected will typically range between 1 and 2 since modem signal amplitudes are usually scaled within the modem 101 to produce an average output power of −9 dBm.

With reference to the operation of this embodiment, the original signal generated by the modem 101 is initially scaled down by the predetermined reduction factor (preset within thee modem) before it is output to the digital network 113. After having its amplitude reduced, the reduced digital signal is μ-law encoded and subsequently inversion mapped. Although the reduction scaling, μ-law encoding and inversion mapping steps are all preferably performed within the transmitting modem 101 itself, as is implied by the segment shown in FIG. 2, it is foreseen that these process steps can be perfomed independently or in combination within the transmitting modem 101, within a digital LEC subscriber loop for and/or within the digital IEC network 113 itself. Upon receipt of the inversion mapped, digital code word at the terminating central office, the digital code word undergoes loss insertion, μ-law decoding and D/A conversion as described above. The resultant analog signal is then transmitted via the analog LEC subscriber loop to the receiving modem 101.

With regard to implementation of the first and second embodiments, the inversion mapping means performs the inversion mapping within one of the digital network 113 and the terminating modem 101 in accordance with the loss characteristics of the particular terminating loop subscriber loop. In either case, the inversion mapping means must comprise means for detecting either the existence of a terminating analog subscriber loop within the path of a particular cell, or alternatively, that loss insertion is occurring in the signals transmitted over the path of the particular cell. Additionally, the inversion mapping means further comprises means for selecting between for version mapping tables stored within an associated buffer. Two different mapping tables are provided so as to account for the different (3 dB and 6 dB) transmission loss characteristics of existing analog subscriber loops. Finally, the inversion mapping means must also comprise means for performing the mapping both in terms of the required logic and digital switching.

With respect to the first embodiment, the elements of the inversion mapping means are preferably implemented within the IEC digital network 113, although it is foreseeable that such elements can be implemented within the central office of the originating LEC central office as well. Referring to FIG. 3, the preferred means for inversion mapping within the digital network 113 is shown as comprising a digital switch and an adjunct processor disposed in the path of the call.

The digital switch comprises a look-up table of called party numbers which identifies those numbers for which the terminating subscriber loop comprises an analog subscriber loop. As an incoming call is received by the switch, switching logic performs a table look-up, and if the terminating subscriber loop is analog, the switching logic re-routes the call to the adjunct processor for inversion mapping. Upon receipt of the re-routed call, the adjunct processor uses its own table look-up of called party numbers to determine the loss characteristics for the particular terminating subscriber loop, and hence, the appropriate table to use for the mapping. Alternatively, the look-up table within the digital switch could also identify the loss characteristics for the particular subscriber loop and pass this information on to the processor in the form of a table selection indicator such that a table look-up by the processor is unnecessary. Once the proper table has been selected, the processor performs the direct code word-to-code word inversion mapping for the transmitted signals, and subsequently re-routes the processed call back to the digital switch. The switch then completes the call by making an outgoing call to the called party, with the now inverted signals being transmitted to the receiving modem 101.

Referring to the preferred implementation of the second embodiment, the reduction scaling, μ-law encoding and inversion mapping are preferably performed entirely within the transmitting modem 101, although each of these processes can also be done individually or in combination within an originating LEC digital subscriber loop or the IEC digital network 113. When the process steps are implemented entirely within the modem 101, the detection means comprises means for detecting the occurrence of loss insertion in the signals transmitted over the network 113. This can be accomplished by means of transmitting at least one test signal comprising a loss inserted signal to the receiving modem 101 and providing circuitry within the transmitting modem 101 that detects a characteristic loss pattern in the reflected signal (via adaptation of the modem's echo canceling circuitry).

Alternatively, the transmitting modem 101 can again transmit at least one test signal to the receiving modem 101 and subsequently monitor the control information sent back from that modem 101. In the latter case, standard behavioral characteristics of the receiving modem 101, such as whether the receiving modem 101 makes a request for a data rate change, can be monitored and used as a detection means for determining the amount of loss inserted in the transmitted signals over the path of the call. In another alternative, circuitry can be provided within each modem 101 of this type such that when the communication is between a pair of the same type of modems, dedicated test and control signals can be used to determine the amount of loss that is inserted in the signal transmissions. It is noted that these latter two detection methods may also be adapted for implementation within the digital network 113 itself, the difference being that the digital switch of the network would have to be adapted to detect and understand the receiving modem's control information or dedicated control signals.

While the embodiments described herein disclose the primary principles of the present invention, it should be understood that these embodiments are merely illustrative since various additions and modifications, which do not depart from the spirit and scope of the invention, are possible. Accordingly, the forgoing Detailed Description is to be understood as being in all cases descriptive and exemplary but not restrictive, and the scope of the invention is to be determined not from the Detailed Description, but rather from the claims as interpreted according to the full breadth permitted by the patent laws.

I claim:

1. A method for minimizing quantization noise in signal transmissions between a transmitting modem and a receiving modem coupled together via a digital network comprising at least an interexchange carrier digital network, at least the receiving modem being coupled to the digital network via an analog subscriber loop, the digital network decoding of the signal transmissions on the digital network and having means for inserting a predetermined loss in the amplitude levels of transmitted signals for reducing echo impairment in the analog subscriber loop, the method comprising the steps of:

transmitting a first signal originating from the transmitting modem to the digital network via a subscriber loop comprising one of an analog subscriber loop and a digital subscriber loop;

converting the first signal into a first digital signal when the first signal is determined to be an analog signal;

encoding one of the first signal and the first digital signal into a first μ-law code word;

scaling the amplitude level of the first code word up by a predetermined inversion factor by mapping the first μ-law code word into a second μ-law code word such that the second code word comprises an amplitude equal to the amplitude of the first code word plus a gain in the amplitude level of the first code word corresponding to the predetermined loss to be inserted in the amplitude level of the first code word;

mapping the second μ-law code word into a third μ-law code word such that the third code word forms a loss inserted code word comprising an amplitude equal to the amplitude of the second code word minus an amount corresponding to the predetermined loss;

decoding the third μ-law code word to derive a second digital signal;

converting the second digital signal into a second analog signal; and     transmitting the second analog signal from the digital network to the receiving modem via the analog subscriber loop.

2. The method of claims 1, wherein for a terminating analog subscriber loop having a loss characteristic of 6 dB, the predetermined inversion factor comprises a factor of 2, and wherein for a terminating analog subscriber loop having a loss characteristic of 3 dB, the predetermined inversion factor comprises a factor of $\sqrt{4}$.

3. The method of claim 1, wherein the step of mapping the first code word into a second code word comprises the steps of:

determining the predetermined loss inserted in the amplitude level of the first signal, the predetermined loss comprising one of a 6 dB loss and a 3 dB loss;

selecting a first mapping table for mapping one of a plurality of first code words into one of a plurality of second code words when the predetermined loss comprises a 6 dB loss, with the plurality of second code words of the first mapping table comprising amplitude levels respectively corresponding to the amplitude levels of the plurality of first code words scaled up by a factor of 2; and     selecting a second mapping table for mapping one of a plurality of first code words into one of a plurality of second code words when the predetermined loss comprises a 3 dB loss, with the plurality of second code words of the second mapping table comprising amplitude levels respectively corresponding to the amplitude levels of the plurality of first code words scaled up by a factor of $\sqrt{4}$.

4. The method of claim 1, wherein the step of transmitting a first signal originating from the transmitting modem to the digital network comprises the step of transmitting the first signal to the digital network via a direct digital access connection between the transmitting modem and the digital network.

5. The method of claim 4, wherein before the step of transmitting a first signal originating from the transmitting modem to the digital network, the method further comprises the step of scaling the amplitude level of the first signal down by a predetermined reduction factor.

6. A signal conversion apparatus for minimizing quantization noise in signal transmissions between a transmitting modem and a receiving modem coupled together via a digital network comprising at least an interexchange digital network, the digital network having means for converting input analog signals to digital signals, means for converting digital signals to output analog signals, means for μ-law encoding and decoding of the signal transmissions on the digital network and means for inserting a predetermined loss in the amplitude levels of transmitted signals when it is determined that the receiving modem is coupled to the digital network via an analog subscriber loop, the apparatus comprising:

a processor of the digital network having means for detecting the existence of a terminating analog subscriber loop coupled to the receiving modem and means for detecting the amount of loss inserted in signal transmissions over the digital network; and a digital switch of the digital network having at least one associated μ-law code word mapping table for mapping one code word into another code word, whereby upon detection by the processor of the existence of a terminating analog subscriber loop for a first μ-law encoded signal, the digital switch maps the first μ-law encoded signal into a second μ-law encoded signal prior to the performance of loss insertion on the first μ-law encoded signal to scale the amplitude level of the first μ-law encoded signal up by a predetermined inversion factor to obtain a gain in the amplitude level of the first μ-law encoded signal corresponding to the amount of the predetermined loss to be inserted in the amplitude level of the first μ-law encoded signal.

7. The apparatus of claim 6, wherein the apparatus comprises at least two associated mapping tables comprising a first and a second mapping table stored in memory, each mapping table having a plurality of first μ-law code words associated with a plurality of second μ-law code words for mapping of the first code words into the second code words, with the plurality of second code words of the first mapping table comprising amplitude levels respectively corresponding to the amplitude levels of the plurality of first code words scaled up by a factor of 2, and with the plurality of second code words of the second mapping table comprising amplitude levels respectively corresponding to the amplitude levels of the plurality of first code words scaled up by a factor of $\sqrt{2}$.

8. The apparatus of claim 7, wherein the processor further comprises means for selecting between the first and second mapping tables, with the first mapping table being selected when the means for determining the amount of loss inserted in signal transmission determines the existence of a 6 dB loss, and with the second mapping table being selected when the means for determining the amount of loss inserted in signal transmission determines the existence of a 3 dB loss.

9. A first digital transmitting modem for minimizing quantization noise in signal transmissions to a second analog receiving modem, the first and second modems coupled together via a first digital local exchange network, an interexchange digital network and a second analog local exchange network, the first modem having means for μ-law encoding and decoding of signals transmitted and received by the first modem, respectively, one of the networks having means for inserting a predetermined loss in the amplitude levels of μ-law encoded signals transmitted from the first digital transmitting modem, the first digital modem comprising:

means for determining the amount of loss inserted in signals transmitted from the first modem to the second modem; and means for mapping one μ-law encoded signal into another μ-law encoded signal, whereby the mapping means maps the first μ-law encoded signal into a second μ-law encoded signal prior to its transmission to the second modem to scale the amplitude level of the first μ-law encoded signal up by a predetermined inversion factor to obtain a gain in the amplitude level of the first μ-law encoded signal corresponding to the detected amount of the loss inserted in signals transmitted from the first modem to the second modem.

10. The modem of claim 9, wherein the means for mapping comprises processor logic and at least two associated mapping tables comprising a first and a second mapping table stored in memory, each mapping table having a plurality of first μ-law encoded signals associated with a plurality of second μ-law encoded signals for mapping of the first μ-law encoded signals into the second μ-law encoded signals, with the plurality of second μ-law encoded signals of the first mapping table comprising amplitude levels respectively corresponding to the amplitude levels of the plurality of first μ-law encoded signals scaled up by a factor of 2, and with the plurality of second μ-law encoded signals of the second mapping table comprising amplitude levels respectively corresponding to the amplitude levels of the plurality of first μ-law encoded signals scaled up by a factor of $\sqrt{2}$.

11. The modem of claim 10, wherein the means for mapping further comprises means for selecting between the first and second mapping tables, with the first mapping table being selected when the means for determining the amount of loss inserted in signal transmission determines the existence of a 6 dB loss, and with the second mapping table being selected when the means for determining the amount of loss inserted in signal transmission determines the existence of a 3 dB loss.

* * * * *